(12) United States Patent
Bayne et al.

(10) Patent No.: US 7,893,653 B2
(45) Date of Patent: *Feb. 22, 2011

(54) MULTIPLE FUNCTION CURRENT-SHARING CHARGING SYSTEM AND METHOD

(75) Inventors: Ryan M. Bayne, Waterloo (CA); Felipe O. Simoes, Kitchener (CA); Colin N. Todd, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/763,721

(22) Filed: Apr. 20, 2010

(65) Prior Publication Data

US 2010/0201319 A1 Aug. 12, 2010

Related U.S. Application Data

(63) Continuation of application No. 12/275,093, filed on Nov. 20, 2008, now Pat. No. 7,714,534, which is a continuation of application No. 10/834,283, filed on Apr. 29, 2004, now Pat. No. 7,471,059.

(30) Foreign Application Priority Data

Apr. 29, 2003 (GB) ................................. 0309804.3

(51) Int. Cl.
*H02J 7/00* (2006.01)
(52) U.S. Cl. ....................... 320/106; 320/110; 320/125; 320/138
(58) Field of Classification Search .................. 320/106
See application file for complete search history.

(56) References Cited

U.S. PATENT DOCUMENTS

| 5,028,859 | A | * | 7/1991 | Johnson et al. ............. 320/125 |
|---|---|---|---|---|
| 5,218,286 | A | | 6/1993 | VanDunk |
| 5,420,493 | A | | 5/1995 | Hargadon et al. |
| 5,477,123 | A | | 12/1995 | Allen et al. |
| 5,541,489 | A | | 7/1996 | Dunstan |
| 5,565,759 | A | | 10/1996 | Dunstan |
| 5,572,110 | A | | 11/1996 | Dunstan |
| 5,600,230 | A | | 2/1997 | Dunstan |
| 5,606,242 | A | | 2/1997 | Hull et al. |
| 5,684,384 | A | | 11/1997 | Barkat et al. |
| 5,701,068 | A | | 12/1997 | Baer et al. |
| 5,717,309 | A | | 2/1998 | Cho |
| 5,764,030 | A | | 6/1998 | Gaza |

(Continued)

FOREIGN PATENT DOCUMENTS

EP 1124300 A2 8/2001

OTHER PUBLICATIONS

USB Implementers Forum, Inc.; Battery Charging Specification; Revision 1.1; Apr. 15, 2009; 44 pgs.
Smart Battery Data Specification at http://www.sbs-forum.org/specs/sbdat110.pdg.; Revision 1.1; Dec. 1998; 54 pgs.

*Primary Examiner* — Edward Tso
*Assistant Examiner* — Yalkew Fantu
(74) *Attorney, Agent, or Firm* — Conley Rose, P.C.; J. Robert Brown, Jr.

(57) ABSTRACT

Multiple function current-sharing charging systems and methods are provided. Where first and second rechargeable power supplies are connected to a charging system, a first charging current is provided to the first rechargeable power supply and a second charging current is provided to the second rechargeable power supply. Upon detection of a predetermined charge level of one of the rechargeable power supplies, a third charging current is provided to the first rechargeable power supply and a fourth charging current is provided to the second rechargeable power supply.

9 Claims, 5 Drawing Sheets

U.S. PATENT DOCUMENTS

| | | |
|---|---|---|
| 5,903,764 A | 5/1999 | Shyr et al. |
| 6,700,351 B2 * | 3/2004 | Blair et al. .................. 320/125 |
| 7,471,059 B2 | 12/2008 | Bayne et al. |
| 2002/0038432 A1 | 3/2002 | Hsu |
| 2003/0048096 A1 | 3/2003 | Liu et al. |
| 2004/0004458 A1 * | 1/2004 | Tanaka et al. ............... 320/106 |

* cited by examiner

MULTIPLE FUNCTION CURRENT-SHARING CHARGING SYSTEM AND METHOD

CROSS-REFERENCE TO RELATED APPLICATIONS

This application is a continuation of U.S. patent application Ser. No. 12/275,093, filed Nov. 20, 2008, now U.S. Pat. No. 7,714,534 B2 issued on May 11, 2010 by Ryan M. Bayne, et al., entitled "Multiple Function Current-Sharing Charging System and Method" (10933-US-CNT-4214-00505) which is a continuation application of U.S. patent application Ser. No. 10/834,283, filed Apr. 29, 2004, by Ryan M. Bayne, et al, now issued as U.S. Pat. No. 7,471,059 on Dec. 30, 2008 and entitled "Multiple Function Current-Sharing Charging System and Method", (10933-US-PAT-4214-00500), which is a filing under 35 U.S.C. 119 which claims priority to United Kingdom Patent Application No. GB 0309804.3 filed Apr. 29, 2003, now GB Patent No. 2401258 B issued on Jun. 22, 2005, by Ryan M. Bayne, et al. and entitled, "Multiple Function Current-Sharing Charging System and Method," (10933-GB-PAT) and which are incorporated by reference herein as if reproduced in their entirety.

BACKGROUND

This invention relates generally to charging of rechargeable power supplies such as batteries.

Providing an external source of power to a portable device, such as a personal digital assistant ("PDA"), a mobile communication device, a cellular phone, a wireless two-way e-mail communication device, and other types of device, requires design considerations with respect to both the device and the power source. For example, many portable devices provide a power interface for receiving power from a power source, for instance to recharge a battery installed in the device. Charging systems configured for charging rechargeable batteries or other rechargeable power supplies that have been removed from a device are also known. Another known type of charging system is a multiple function charging system configured to charge a power supply whether it is installed in a device or removed from the device.

Multiple function charging systems enabled for connection of more than one power supply at a time generally charge power supplies in a serial fashion. One power supply is typically charged at a time. Although more than one power supply, such as a device with a battery installed and a spare battery, may be connected to the charging system, charging current is applied to only one power supply at any time. As such, known multiple function chargers offer no charging time advantage over charging systems that accept only one power supply at a time. In the above example of a device and a spare battery simultaneously connected to a charging system, the battery inside the device is normally charged first, and only then is the spare battery charged. The total charging time for the device battery and the spare battery is substantially the same as the time required to charge each battery separately.

SUMMARY

According to an aspect of the invention, a multiple function current-sharing charging system comprises a power source interface configured to receive energy from a power source, a power converter connected to the power source and configured to regulate the energy received from the power source and to output charging current, a plurality of power supply interfaces configured for connection to respective rechargeable power supplies, and a charging controller connected to the power converter to receive the charging current and to the plurality of power supply interfaces, and configured to detect connection of a first rechargeable power supply to a first one of the plurality of power supply interfaces, to determine whether a second rechargeable power supply is connected to a second of the plurality of power supply interfaces, and to provide a first charging current to one of the first and second rechargeable power supplies and a second charging current to the other of the first and second rechargeable power supplies where a second rechargeable power supply is connected to a second of the plurality of power supply interfaces.

In accordance with another aspect of the invention, a current-sharing charging method for a multiple function charging system comprises the steps of detecting connection of a first rechargeable power supply to the charging system, determining whether a second rechargeable power supply is connected to the charging system, and where a second rechargeable power supply is connected to the charging system, providing a first charging current to the first rechargeable power supply, and providing a second charging current to the second rechargeable power supply.

BRIEF DESCRIPTION OF THE DRAWINGS

In order that the invention identified in the claims may be more clearly understood, preferred embodiments thereof will be described in detail by way of example, with reference to the accompanying drawings, in which:

DETAILED DESCRIPTION

Figure 1:
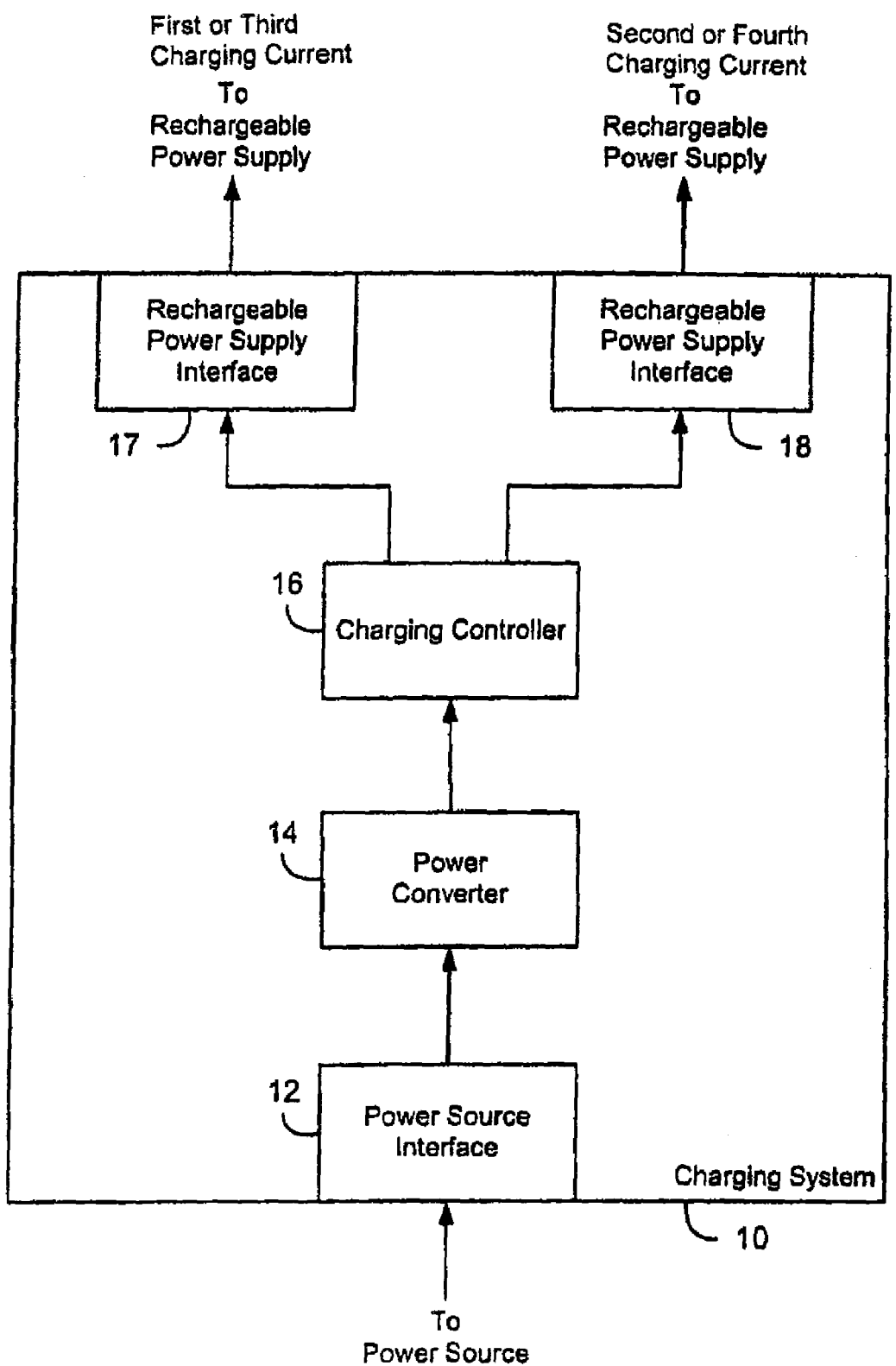
FIG. 1 is a block diagram of a multiple function current-sharing charging system.

FIG. 1 is a block diagram of a multiple function current-sharing charging system. The charging system 10 includes a power source interface 12, a power converter 14, a charging controller 16, and rechargeable power supply interfaces 17 and 18.

The power source interface 12 is configured for connection to a power source from which rechargeable power supplies are charged. In one embodiment, the power source interface 12 is a plug unit that can be used to couple with a conventional power socket to receive power therefrom. For example, such a plug unit may be a two prong or three prong plug of the type used in North America that can couple to a North American AC power socket. Alternatively, the power source interface 12 can accept one or more types of plug adapters configured to couple the power source interface 12 to corresponding types of power sockets. The use of interchangeable plug adapters has the advantage of allowing the same charging system to be used with a variety of types of power sources, depending on availability. Thus, the power source interface 12 is configured to receive energy from a power source either directly or through the use of a plug adapter, and is operative to transfer the received energy to the power converter 14.

A power converter such as 14 typically includes at least one of the following components: a switching converter, a transformer, a DC source, a voltage regulator, linear regulator, and a rectifier. The power converter 14 is operative to receive energy from a power source through the power source interface 12, and to convert that received energy to a form that can be used to charge power supplies connected to the charging system 10. For example, the power converter 14 can be of substantially conventional construction, such as a switching power converter that converts 115 VAC to 5 VDC. DC-to-DC converters or DC regulators, which convert DC inputs to DC outputs are also common in such power converters. In one embodiment, the power converter 14 is adapted to accept a wide range of input energy levels and frequencies from the power source interface 12. Alternatively, the power converter 14 is adapted to accept a limited range of input energy levels and frequencies, and the power source interface 12, or each plug adapter if any, is operable to convert the input energy levels and frequencies into a range that the power converter 14 can accommodate. The power converter 14 provides its energy output to the charging controller 16.

The charging controller 16 controls the amount of charging current applied to each rechargeable power supply connected to the power supply interfaces 17 and 18. Where only one power supply is connected to an interface 17 or 18, the charging controller 16 outputs full charging current, which may vary between different power supplies or types of power supply, to that power supply. The charging controller 16 is also configured to implement current sharing between multiple connected power supplies, as described in further detail below. Although the charging controller 16 is preferably implemented in firmware, such as a microprocessor executing charging control software, those skilled in the art appreciate that hardware implementations of the charging controller 16 are also possible.

Each power supply interface 17 and 18 is compatible with a charging input on a corresponding power supply. The power supply interfaces 17 and 18 may be of the same or different types. For example, in one possible embodiment, the power supply interface 17 is configured for direct connection to a battery, whereas the power supply interface 18 is configured for connection to battery through other circuits or components in a device in which a battery is installed. Alternatively, a power supply interface 17 or 18, or each of the interfaces, is configured to receive power supply adapters so as to indirectly connect to different types of power supplies.

In operation, the charging controller 16 detects the connection of a rechargeable power supply to a power supply interface 17 or 18. If each power supply interface 17 and 18 is configured for connection to a particular type of power supply, then the charging controller determines the type of a power supply, and thus the appropriate charging currents for the power supply, by determining to which power supply interface 17 or 18 the power supply is connected. Otherwise, the charging controller detects the type of connected power supply, for example, by performing voltage and current tests on the power supply.

If only one power supply is connected to a power supply interface 17 or 18, then a full charging current is output to that power supply by the charging system 10. As described briefly above and in more detail below in the context of a battery and a device, full charging currents may be different for different types of device. In accordance with an aspect of the invention, where a power supply is connected to each power supply interface 17 and 18, the charging controller shares available charging current between each power supply. Since the charging system 10 is typically capable of supplying more charging current than one power supply draws, full charging current is supplied to one of the connected power supplies, and any or all available excess charging current is output to the other connected power supply by the charging controller 16. Thus, one power supply receives full charging current, and the other receives remaining available charging current, referred to herein primarily as "trickle" charging current.

Those skilled in the art will appreciate that an amount of trickle charging current available is dependent upon such factors as the output characteristics of the charging system 10 and the full charging current of the connected power supplies. In alternate embodiments, the charging controller 16 is configured to output a predetermined trickle charging current or a variable trickle charging current dependent upon the available excess charging current.

The charging controller 16 also detects a charge level of each connected power supply. Initially, the power supply that receives its full charging current charges faster than the other power supply. When the full charging power supply is charged to a predetermined level, which is detected by the charging controller 16 by monitoring charging current or terminal voltage of that power supply, for example, the charging controller 16 switches full charging current to the other power supply, and trickle charging current to the power supply that was previously receiving full charging current. The charging controller 16 compares voltage and/or current levels to respective thresholds, which may be different for different power supplies, to determine when to switch between full charging current and trickle charging current. In a firmware implementation, a microprocessor in the charging controller 16 receives voltage and/or current level indications on input pins connected to voltage and current sensing circuits and software executed by the microprocessor performs the comparison and initiates the switch between full and trickle charging currents.

In conventional multiple function charging systems, power supplies are charged serially, such that one connected power supply receives its full charging current while the other receives no charging current. When one power supply is fully charged, its charging current is turned off, and the other power supply receives its full charging current. Total charging time for two power supplies is therefore equal to the separate charging time for each power supply. Current sharing as described herein provides both full charging current to one power supply and trickle charging current to another power supply. As such, the other power supply is slowly charging even while the one power supply is receiving its full charging current. When the charging controller 16 switches full charging current to the other power supply, it has already partially charged, which thereby reduces the total charging time for the two power supplies relative to conventional charging systems.

Although reference is made to full charging current and trickle charging current in the foregoing description, it should be appreciated that the invention is in no way restricted to any particular charging current levels. Where multiple power supplies are connected to a charging system, the charging controller 16 provides a first charging current to a first power supply and a second charging current to a second power supply. When the first power supply has charged to a predetermined level, a third charging current lower than the first charging current is output to the first power supply and a fourth charging current higher than the second charging current is output to the second power supply. In the preceding description, the first and fourth charging currents are the full charging currents of each power supply, and the second and third charging currents correspond to the trickle charging current.

Figure 2:
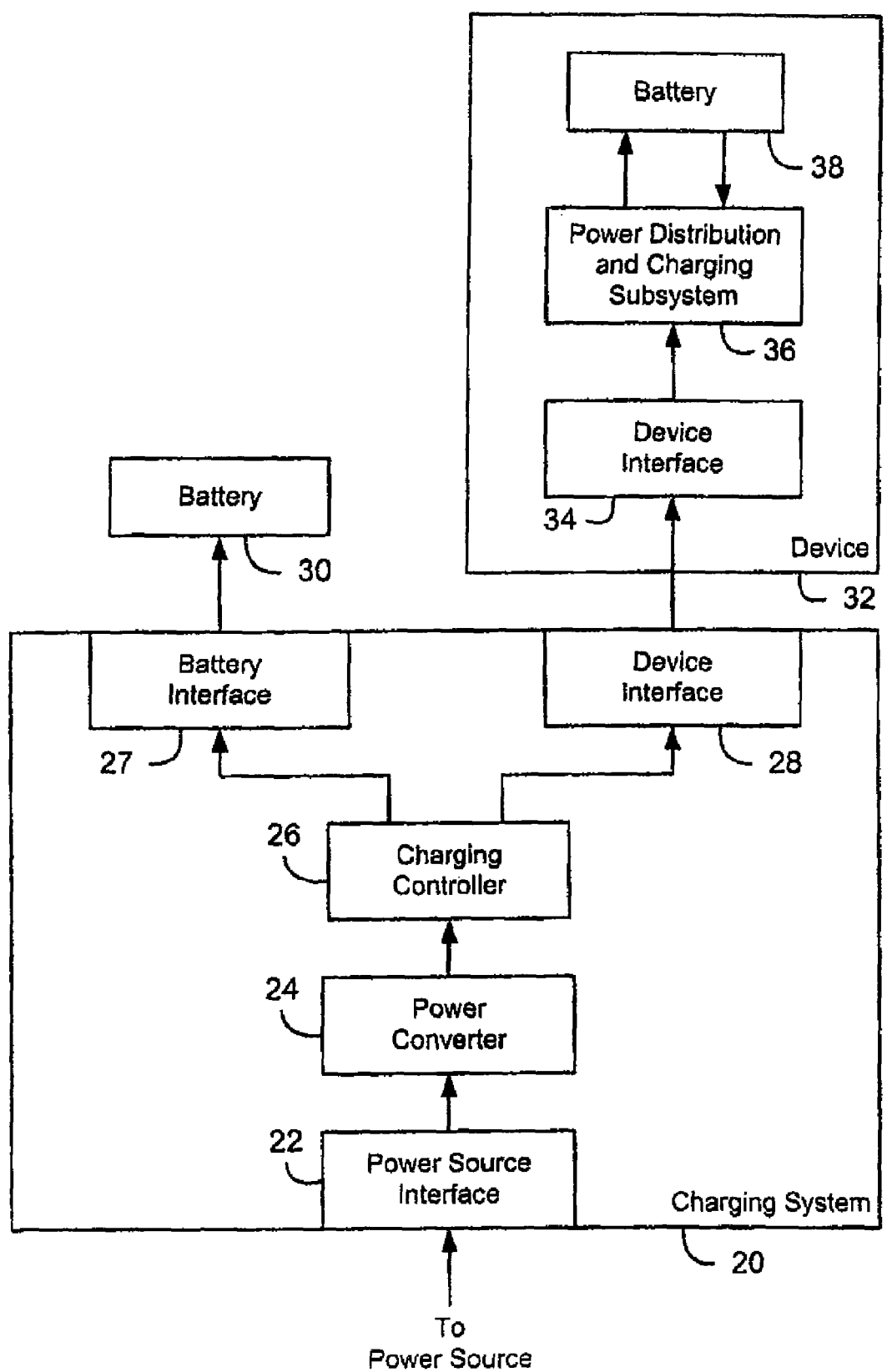
FIG. 2 is a block diagram of a multiple function charging system connected to a mobile device and a battery.

FIG. 2 is a block diagram of a multiple function charging system connected to a mobile device and a battery. In the charging system 20, the components 22, 24, 26, 27, and 28 are substantially the same as the similarly-labelled components in FIG. 1, except that the rechargeable power supply interfaces 27 and 28 are a battery interface and a device interface, respectively. In the embodiment shown in FIG. 2, the charging system 20 is configured for use with both a battery 30 and a device 32.

The battery interface 27, or an adapter configured for connection to the battery interface 27, is compatible with connectors in the battery 30. Where the battery 30 is a spare battery for the device 32, for example, the battery interface 27 may be similar to an interface (not shown) associated with in the power distribution and charging subsystem 36. Similarly, the device interface 28 is compatible with the device interface 34 or an interchangeable adapter compatible with both interfaces 28 and 34.

The device 32 may be a wireless mobile communication device such as a dual-mode data and voice communication device, a mobile telephone with or without data communications functionality, or a data communication device, for example, or another portable device, with or without communications capabilities. Even though wireless communication devices are one of the most common types of devices with which charging systems are used, the present invention is in no way restricted to communication devices, or any other type of device. Current-sharing charging as described herein is applicable to other types of devices and rechargeable power supplies.

The battery 38 supplies power for the device 32 through the power distribution and charging subsystem 36. The power distribution and charging subsystem 36 preferably uses the power provided by the charging system 20 to provide operating power to the device 32 and to charge the battery 38. The particular design of the power distribution and charging subsystem 36 is dependent upon the type of the device 32, as will be apparent to those skilled in the art, and is substantially independent of the current-sharing scheme implemented in the charging system 20.

If only the battery 30 or the device 32 is connected to the charging system 20, then the charging controller 26 determines which one of the battery 30 and the device 32 is connected, and outputs the corresponding full charging current to the appropriate interface 27 or 28. Although the battery 30 and the battery 38 may be the same type of battery, the full charging currents may different, since the battery 38 is installed in the device 32. As described above, the power distribution and charging subsystem 36 preferably uses power received from the charging system 20 to both power the device 32 and charge the battery 38. As such, the device 32 may draw higher current from the charging system 20 due to the additional power requirements of other components in the device 32 to which power is distributed by the power distribution and charging subsystem 36. For example, the battery 30 may be rated for a typical full charging current of 700 mA, whereas the device 32 is rated for a typical full charging current of 750 mA.

When both the battery 30 and the device 32 are connected to the charging subsystem 20, the charging controller 26 distributes full charging current to one, and trickle charging current to the other. In most cases, a user would prefer to charge the device 32 first so that the device can be disconnected from the charging system 20. However, the charging controller 26 may alternatively be configured to designate the battery 30 as a primary power supply for initial full charging current and the device 32 as a secondary power supply for initial trickle charging. Manual selection of the primary power supply, using a switch on the charging system 20, for example, or a configurable system in which a device provides to the charging system 20 an indication of its rank or precedence, are also contemplated.

In order to further illustrate current-sharing charging, consider an illustrative example in which the charging system 20 has a maximum output of 825 mA, the battery 30 is the secondary power supply and has a full charging current of 700 mA, and the device 32 is the primary power supply and has a full charging current of 750 mA. The charging controller 26 detects the connection of both rechargeable power supplies (i.e., the battery 30 and the device 32) to the interfaces 27 and 28, and supplies the full charging current of 750 mA to the device 32. The charging controller 26 also provides trickle charging current to the battery 30. As described above, trickle charging current may be set at a predetermined level at or below the available excess charging current, which is 825 mA maximum output of the charging system 20 less the 750 mA drawn by the device 32, or 75 mA. For the purposes of this example, trickle charging current is set at 50 mA. Therefore, initially, the device 32 draws its full charging current of 750 mA, and the battery 30 draws trickle charging current of 50 mA.

After the battery 38 in the device 32 has been charged to a predetermined level, as determined based on a measured terminal voltage, for example, the charging controller 26 provides the battery 30 with its full charging current of 700 mA and switches the device 32 to the trickle charging current of 50 mA. When both the battery 30 and the battery 38 are fully charged, the charging system 20 preferably enters an idle state and no further charging current is drawn from the charging system 20. In some implementations, the charging controller 26 may be configured to continue to provide operating power to the device 32 so that battery power is conserved until the device 32 is disconnected from the charging system 20.

Other switching schemes and current sharing schemes will also be obvious to those skilled in the art, and as such, are considered to be within the scope of the invention. For example, many known charging systems provide several charging phases. A constant current charging phase during which a constant full charging current is provided to a power supply until the power supply reaches a predetermined terminal voltage is common. After the power supply reaches the predetermined terminal voltage, a constant voltage charging phase provides decreasing levels of charging current to the power supply to maintain the terminal voltage. When the power supply draws less than a predetermined amount of current, a typically time-limited top-off charging phase completes the charging cycle. In the example above, full to trickle charging current switching is based on terminal voltage of a primary power supply, and thus may coincide with a transition from a constant current charging phase to a constant voltage charging phase. Alternatively, the full to trickle charging current switching may be dependent upon the charging current drawn by the primary power supply, coinciding with the constant voltage charging phase to top-off charging phase transition, for example. Where trickle charging current is not set to a predetermined current as above, the charging controller 26 could be configured for "gradual" switching between full and trickle charging current. In the above example, as charging current drawn by the device 32 decreases during a constant voltage charging phase, more charging current could be supplied to the battery 30. After the device 32 draws less than 825−700=125 mA, the battery 30 receives its full charging current of 700 mA from the charging system 20.

Figure 3:
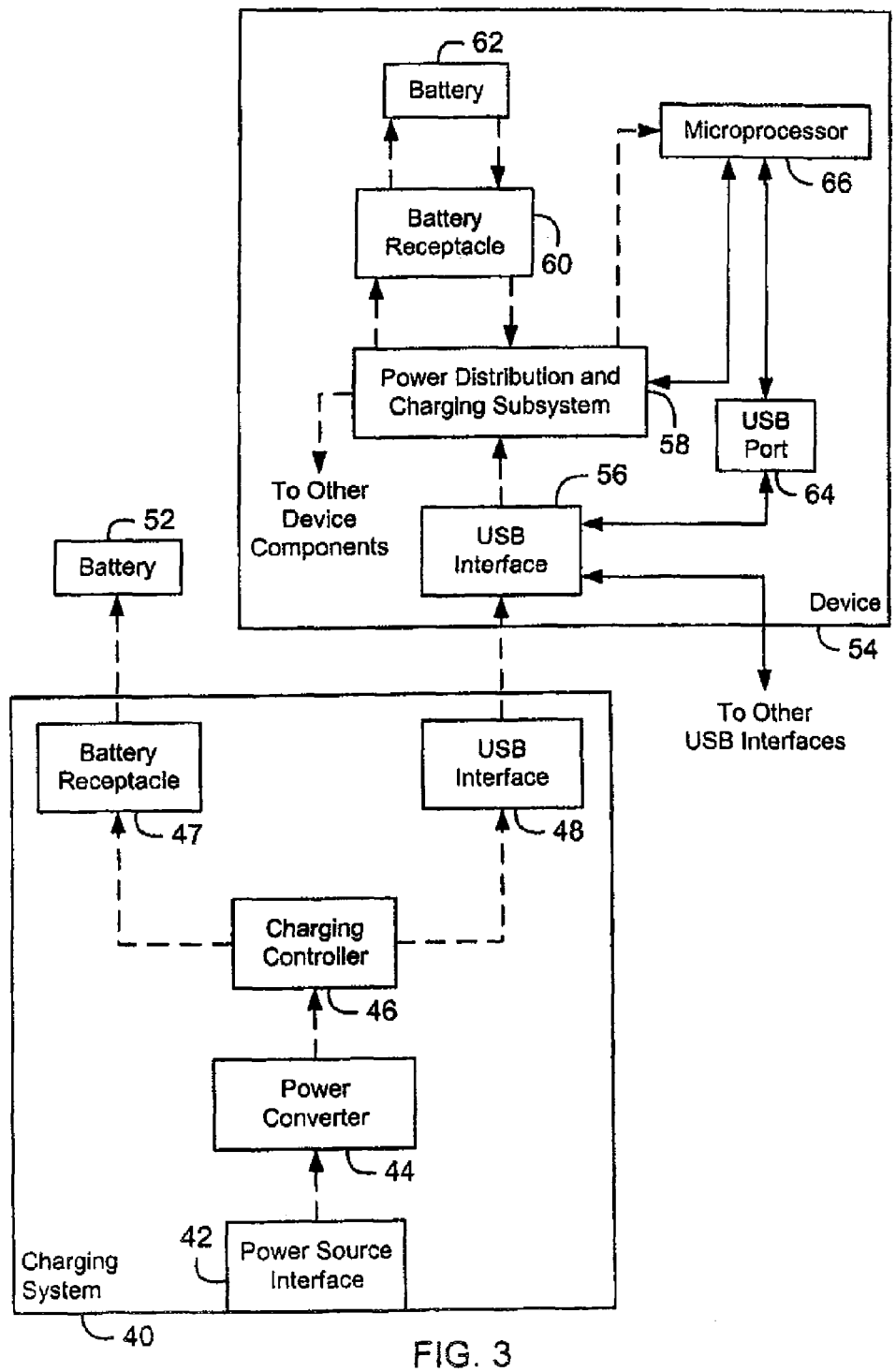
FIG. 3 is a block diagram of a multiple function current-sharing charging system incorporating a Universal Serial Bus (USB) interface and a battery receptacle.

FIG. 3 is a block diagram of a multiple function current-sharing charging system incorporating a USB interface and a battery receptacle. In FIG. 3, dashed lines indicate power transfer, while solid lines are used for data connections. The charging system 40 is substantially the same as the charging systems 10 and 20, except that the power supply interfaces are a battery receptacle 47 and a USB interface 48.

The battery receptacle 47 is configured to receive the battery 52, which is a spare battery for the device 54 in one embodiment. In this case, the battery receptacle 47 is substantially similar to the battery receptacle 60, although the battery receptacle 47 need not necessarily transfer power from the battery 52 to the charging system 40.

The device 54 is also substantially similar to the device 32, including a USB interface 56 to the charging system 40, a power distribution and charging subsystem 58, and a battery 62. Although an interface to the battery 38 is inherent in the power distribution and charging subsystem 36 in FIG. 2, the battery receptacle 60 is an example of such an interface. The device 54 also includes a USB port 64 and a microprocessor 66. In the device 54, the power distribution and charging subsystem 58 provides operating power to the microprocessor 66 and other device components. A data connection between the microprocessor 66 and the power distribution and charging subsystem 58 provides for software-based control and monitoring of the power distribution and charging subsystem 58, so that the microprocessor 66 can determine a remaining charge level of the battery 62 and provide an indication of battery charge to a user, for example.

Typically, USB devices can draw limited current from a USB host. In the case of a charging system, such a limit may be undesirable. Therefore, when the device 54 is connected to the USB interface 48, an identification signal is preferably provided to the device 54 to notify the device 54 that it is connected to a power source that is not subject to the normal power limits imposed by the USB specification. Such an identification signal is provided, for example, by the charging controller 46. The device 54, or in most implementations the microprocessor 66, recognizes the identification signal and enables the power distribution and charging system to draw power through Vbus and Gnd lines of the USB interface 56 without waiting for the normal USB processes of enumeration or charge negotiation.

The detection of the identification signal may be accomplished using a variety of methods. For example, the microprocessor 66 may detect the identification signal by detecting the presence of an abnormal data line condition at the USB port 64. The detection may also be accomplished through the use of other device subsystems in the device 54. One preferred identification signal results from the application of voltage signals greater than 2 volts to both the D+ and D− lines in the USB interface 48 by the charging controller 46, which can then be detected at the device 54. Further details of USB-based charging are provided in the following U.S. patent application Ser. Nos. 10/087,629, and 10/087,391, both filed on Mar. 1, 2002 and assigned to the owner of the instant application. The disclosure of each of these applications, including the specification and drawings thereof, is hereby incorporated in its entirety herein by reference.

Operation of the charging system 40 is substantially as described above. Either the battery 52 or the device 54 is provided with its full charging current, while the other receives trickle charging current. When full charging device is charged to a predetermined level, then the charging controller switches the trickle charging device to full charging current and vice-versa. However, the USB connection between the device 54 and the charging system 40 could be further exploited beyond charging the device 54. For example, charging level determination for the battery 62 could be left to the device 54 instead of the charging controller 46. A data connection (not shown) between the USB interfaces 56 and 48 allows the device microprocessor 66 to signal the charging controller 46 when the battery 62 reaches a predetermined charging level. As shown, the USB interface 56 may also be connected to other USB interfaces in other devices or systems, to support such extended functions as indirectly charging such other devices and systems through the device 54 through a conventional USB connection. The device 54 then provides an interface to a power supply that is not itself compatible with the charging system 40.

Figure 4:
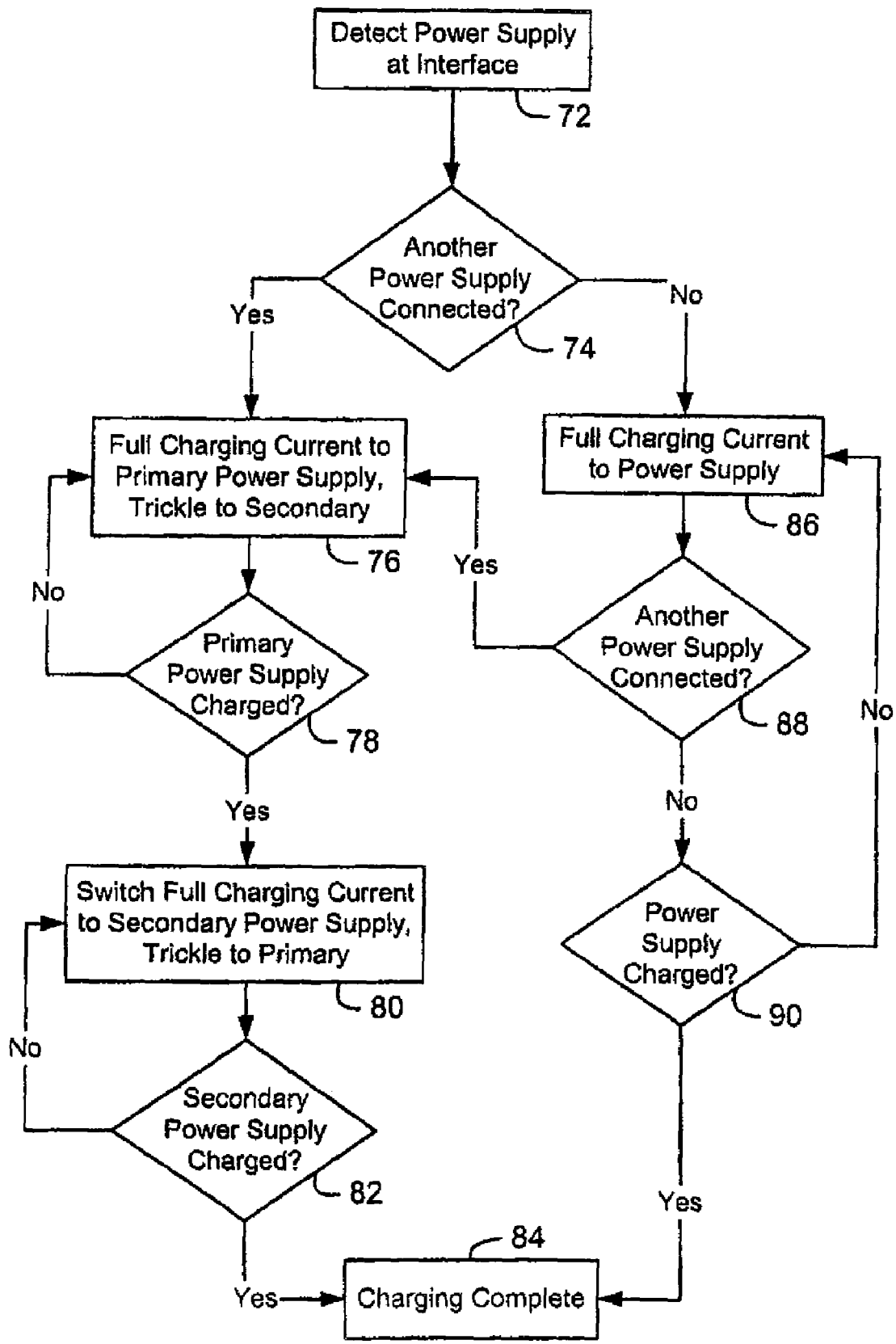
FIG. 4 is a flow diagram illustrating a current-sharing charging method.

FIG. 4 is a flow diagram illustrating a current-sharing charging method. The steps in the method have been described in detail above and are therefore described briefly below.

The method begins at step 72, in which connection of a rechargeable power supply to an interface is detected. At step 74, a determination is made as to whether another power supply is connected. If so, then full charging current is provided to one power supply, the primary power supply, and trickle charging current is provided to the other, secondary, power supply. Step 78 illustrates monitoring of the charging level of the primary power supply. When the primary power supply is charged to a predetermined level, the secondary power supply is switched to full charging current and the primary power supply is switched to trickle charging current. When the secondary power supply is charged, as determined at step 82, charging is complete, as indicated at 84.

Where no other power supply is connected, as determined at step 74, the connected power supply is provided with its full charging current at step 86. If it is determined at step 88 that another power supply is subsequently connected to the charging system, then the method reverts to step 76. Otherwise, the power supply receives its full charging current until it is determined at step 90 that the power supply is charged.

The method shown in FIG. 4 and described above is one illustrative example of a current-sharing charging method. Modifications of the method are possible without departing from the invention. For example, the current-sharing method in FIG. 4 could be adapted to a multiple-phase charging cycle including a constant current phase, a constant voltage phase, and a time-limited top-off charging phase, as described above. In addition, just as the method reverts to step 76 from step 88 when a second power supply is connected, the method proceeds to step 86 if the primary power supply is disconnected while the secondary power supply is receiving trickle charge. Further, although the decision steps 78, 82, 88 and 90 are shown as separate steps, it should be appreciated that these steps may instead be monitoring operations that are performed during power supply charging. For instance, the charging at steps 76, 80, and 86 need not be halted to check a power supply charge level at steps 78, 82, and 90. Charge level is preferably monitored during charging. Similarly, detection of another power supply at step 88 preferably interrupts the charging at step 86, but the operation of detecting whether another power supply has been connected, such as by polling an interface or monitoring for a detection signal, preferably does not require the charging to be halted.

Figure 5:
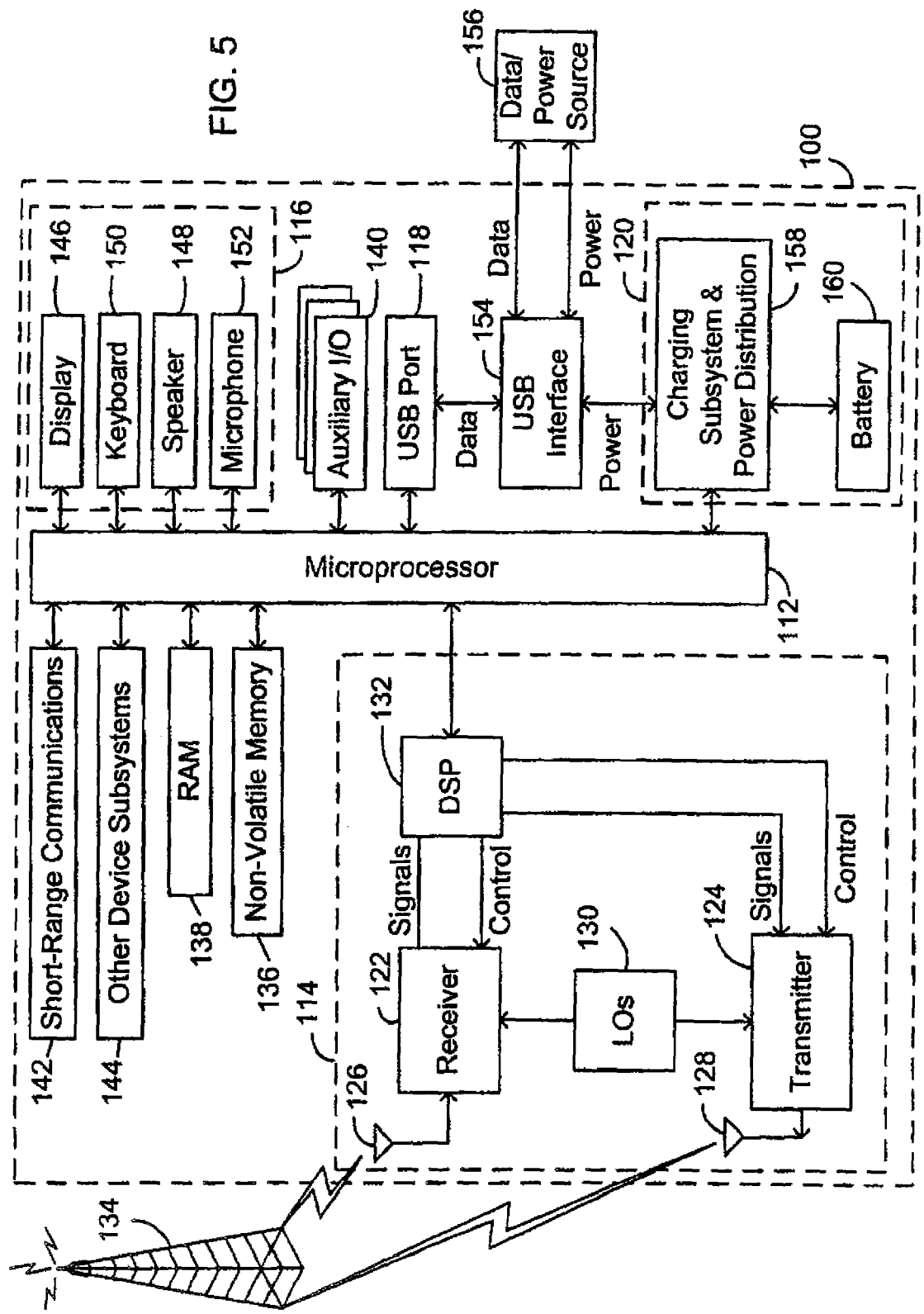
FIG. 5 is a block diagram of a wireless mobile communication device.

FIG. 5 is a block diagram of a wireless mobile communication device, which is one type of device for which the current-sharing charging schemes disclosed herein is applicable. The wireless mobile communication device ("mobile device") 100 is preferably a two-way communication device having at least voice or data communication capabilities. Preferably, the mobile device 100 is also capable of communicating over the Internet, for example, via a radio frequency ("RF") link.

The exemplary mobile device 100 comprises a microprocessor 112, a communication subsystem 114, input/output ("I/O") devices 116, a USB port 118, and a power subsystem 120. The microprocessor 112 controls the overall operation of the mobile device 100. The communication subsystem 114 provides the mobile device 100 with the ability to communicate wirelessly with external devices such as other mobile devices and other computers. The I/O devices 116 provide the mobile device 100 with input/output capabilities for use with a device user. The USB port 118 provides the mobile device 100 with a serial port for linking directly with other computers and/or a means for receiving power from an external power source, as described above. The power subsystem 120 provides the mobile device 100 with a local power source.

The communication subsystem 114 comprises a receiver 122, a transmitter 124, antenna elements 126 and 128, local oscillators (LOs) 130, and a digital signal processor (DSP) 132. The particular design of the communication subsystem 114 and the components used therein can vary. It would be apparent to one of ordinary skill in the art to design an appropriate communication subsystem using conventional methods and components to operate over a communication network 134 based on the parameters necessary to operate over that communication network. For example, a mobile device 100 geographically located in North America may include a communication subsystem 114 designed to operate within the Mobitex™ mobile communication system or DataTAC™ mobile communication system, whereas a mobile device 100 intended for use in Europe may incorporate a General Packet Radio Service (GPRS) communication subsystem 114.

Network access requirements will also vary depending upon the type of network 134. For example, in the Mobitex and DataTAC networks, mobile devices 100 are registered on the network using a unique personal identification number or PIN associated with each device. In GPRS networks however, network access is associated with a subscriber or user of a mobile device 100. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the mobile device 100 will be unable to carry out any functions involving communications over the network 134, other than legally required functions such as '911' emergency calling.

When required, after the network registration or activation procedures have been completed, a mobile device 100 may send and receive communication signals over the network 134. Signals received by the antenna element 126 are input to the receiver 122, which typically performs such common receiver functions as signal amplification, frequency down conversion, filtering, channel selection, and in the exemplary system shown in FIG. 5, analog to digital conversion. Analog to digital conversion of a received signal allows more complex communication functions such as demodulation and decoding to be performed in the DSP 132. Similarly, signals to be transmitted are processed, including modulation and encoding for example, by the DSP 132 and input to the transmitter 124 for digital to analog conversion, frequency up conversion, filtering, amplification, and transmission over the communication network 134 via the transmitter antenna element 128. The DSP 132 not only processes communication signals, but also provides for receiver and transmitter control. For example, signal gains applied to communication signals in the receiver 122 and transmitter 124 may be adaptively controlled through automatic gain control algorithms implemented in the DSP 132.

In implementing its device operation control function, the microprocessor 112 executes an operating system. The operating system software used by the microprocessor 112 is preferably stored in a persistent store such as the non-volatile memory 136, or alternatively read only memory (ROM) or similar storage element. The microprocessor 112 may also enable the execution of specific device software applications, which preferably are also stored in a persistent store. The operating system, specific device applications, or parts thereof, may also be temporarily loaded into a volatile store such as in RAM 138. The non-volatile memory 136 may be implemented, for example, as a flash memory component, or a battery backed-up RAM, for example.

A predetermined set of software applications which control basic device operations, including at least data and voice communication applications for example, will normally be installed on the mobile device 100 during manufacture. One such application loaded on the mobile device 100 could be a personal information manager (PIM) application. The PIM application is preferably a software application for organizing and managing user inputted data items such as e-mail, calendar events, voice mails, appointments, and task items. The PIM data items may be stored in the RAM 138 and/or the non-volatile memory 136.

The PIM application preferably has the ability to send and receive data items, via the wireless network 134. The PIM data items are preferably seamlessly integrated, synchronized and updated, via the wireless network 134, with corresponding data items stored or associated with a host computer system (not shown) used by the device user. The synchronization of PIM data items is a process by which the PIM data items on the mobile device 100 and the PIM data items on the host computer system can be made to mirror each other.

There are several possible mechanisms for loading software applications onto the mobile device 100. For example, software applications may be loaded onto the mobile device 100 through the wireless network 134, an auxiliary I/O subsystem 140, the USB port 118, a short-range communications subsystem 142, such as an infrared ("IR"), Bluetooth™, or 802.11 communication system, or any other suitable subsystem 44. Those skilled in the art will appreciated that "Bluetooth" and "802.11" refer to sets of specifications, available from the Institute for Electrical and Electronics Engineers (IEEE), relating to wireless personal area networks and wireless local area networks, respectively.

When loading software applications onto the mobile device 100, the device user may install the applications in the RAM 138 or the non-volatile memory 136 for execution by the microprocessor 112. The available application installation mechanisms can increase the utility of the mobile device 100 by providing the device user with a way of upgrading the mobile device 100 with additional and/or enhanced on-device functions, communication-related functions, or both. For example, a secure communication application may be loaded onto the mobile device 100 that allows for electronic commerce functions or other financial transactions to be performed using the mobile device 100.

The I/O devices 116 are used to accept inputs from and provide outputs to a user of the mobile device 100. In one mode of operation, a signal received by the mobile device 100, such as a text message or web page download, is received and processed by the communication subsystem 114, forwarded to the microprocessor 112, which will preferably further process the received signal and provides the processed signal to one or more of the I/O devices 116 such as the display 146. Alternatively, a received signal such as a voice signal is provided to the speaker 148, or alternatively to an auxiliary I/O device 140. In another mode of operation, a device user composes a data item such as an e-mail message using a keyboard 150 in cooperation with the display 146 and/or possibly an auxiliary I/O device 140. The composed data item may then be transmitted over a communication network 134 using the communication subsystem 114. Alternatively, a device user may compose a voice message via a microphone 152, or participate in a telephone call using the microphone 152 and the speaker 148.

The short-range communications subsystem 142 allows the mobile device 100 to communicate with other systems or devices, which need not necessarily be similar to device 100. For example, the short-range communications subsystem 142 may include an infrared device, a Bluetooth module, or an 802.11 module, as described above, to support communications with similarly-enabled systems and devices.

The USB port 118 provides the mobile device 10 with a serial port for linking directly with other computers to exchange data and/or to receive power. The USB port 118 also provides the mobile device 100 with a means for receiving power from an external power source. For example, in a personal digital assistant (PDA)-type communication device, the USB port 118 could be used to allow the mobile device 100 to synchronize data with a user's desktop computer (not shown). The USB port 118 could also enable a user to set parameters in the mobile device 100 such as preferences through the use of an external device or software application. In addition, the USB port 118 provides a means for downloading information or software to the mobile device 100 without using the wireless communication network 134. The USB port 118 provides a direct and thus reliable and trusted connection that may, for example, be used to load an encryption key onto the mobile device 100 thereby enabling secure device communication.

Coupled to the USB port 118 is a USB interface 154. The USB interface 154 is the physical component that couples the USB port to the outside world. In the exemplary mobile device 100, the USB interface 154 is used to transmit and receive data from an external data/power source 156, receive power from the external data/power source 156, direct the transmitted/received data from/to the USB port 118, and direct the received power to the power subsystem 120.

The power subsystem 120 comprises a charging and power distribution subsystem 158 and a battery 160, which have been described above. In conjunction with a charging system connected as the data/power source 156, current-sharing charging of the mobile device 100 and a spare battery therefor, in accordance with aspects of the present invention, is supported.

This written description may enable those skilled in the art to make and use embodiments having alternative elements that correspond to the elements of the invention recited in the claims. The intended scope of the invention thus includes other structures, systems or methods that do not differ from the literal language of the claims, and further includes other structures, systems or methods with insubstantial differences from the literal language of the claims.

For example, it would be obvious to implement current-sharing charging for more than two power supplies. In this case, a primary power supply receives its full charging current, and available excess charging current is then distributed among one or more secondary power supplies.

What is claimed is:

1. A method of charging rechargeable power supplies comprising:

providing a charging system having at least one universal serial bus (USB) connection and at least one non-USB charging interface;

providing a first charging current usable to charge a first rechargeable power supply via the USB connection using a USB V-bus power line;

determining an available second charging current based on a difference between the first charging current and a maximum output of the charging system; and while continuing to provide the first charging current at the USB V-bus power line, providing a second charging current at one of the at least one non-USB charging interface, the second charging current usable for charging a second rechargeable power supply, the second charging current based on the available second charging current.

2. The method of claim 1 where the second charging current comprises the majority of the available second charging current.

3. The method of claim 1 comprising:

determining that the first rechargeable power supply is substantially charged; and applying to the second charging current a charging current based on the total output current available from the charging system.

4. The method of claim 1 where the at least one non-USB charging interface comprises a connection enabled for use to connect to a second rechargeable power supply that is outside of a mobile device.

5. The method of claim 1 where as the first rechargeable power supply charges, gradually reducing power of the first charging current applied to the first rechargeable power supply.

6. A method of charging power supplies comprising:

providing a charging system comprising a universal serial bus (USB) connection and a non-USB connection;

sending an identification signal via a first USB connection using the first USB's data lines, the identification signal configured to be receivable by a first device with a first rechargeable power supply and allowing recognition that the charging system can provide charging current for a rechargeable power supply;

providing a first charging current to the USB connection using a first V-bus power line;

determining an available second charging current based on a difference between the first charging current and a maximum output of the charging system; and while continuing to provide the first charging current using the first V-bus power line, providing the available second charging current to the non-USB connection.

7. The method of claim 6 where the non-USB connection is configured to interface with a rechargeable power supply that is not in a mobile device.

8. The method of claim 6 where the second charging current comprises the majority of the available second charging current.

9. The method of claim 6 comprising:

determining that the current being drawn through the first V-power line indicates the first rechargeable power supply is substantially charged; and enabling the amount of current to be drawn through the non-USB connection to approach the maximum output of the charging system.

\* \* \* \* \*